Dec. 21, 1943.  W. ISCHE  2,337,105
AIR CONDITIONER AND HEATER FOR BUILDINGS
Filed April 9, 1941  2 Sheets-Sheet 1
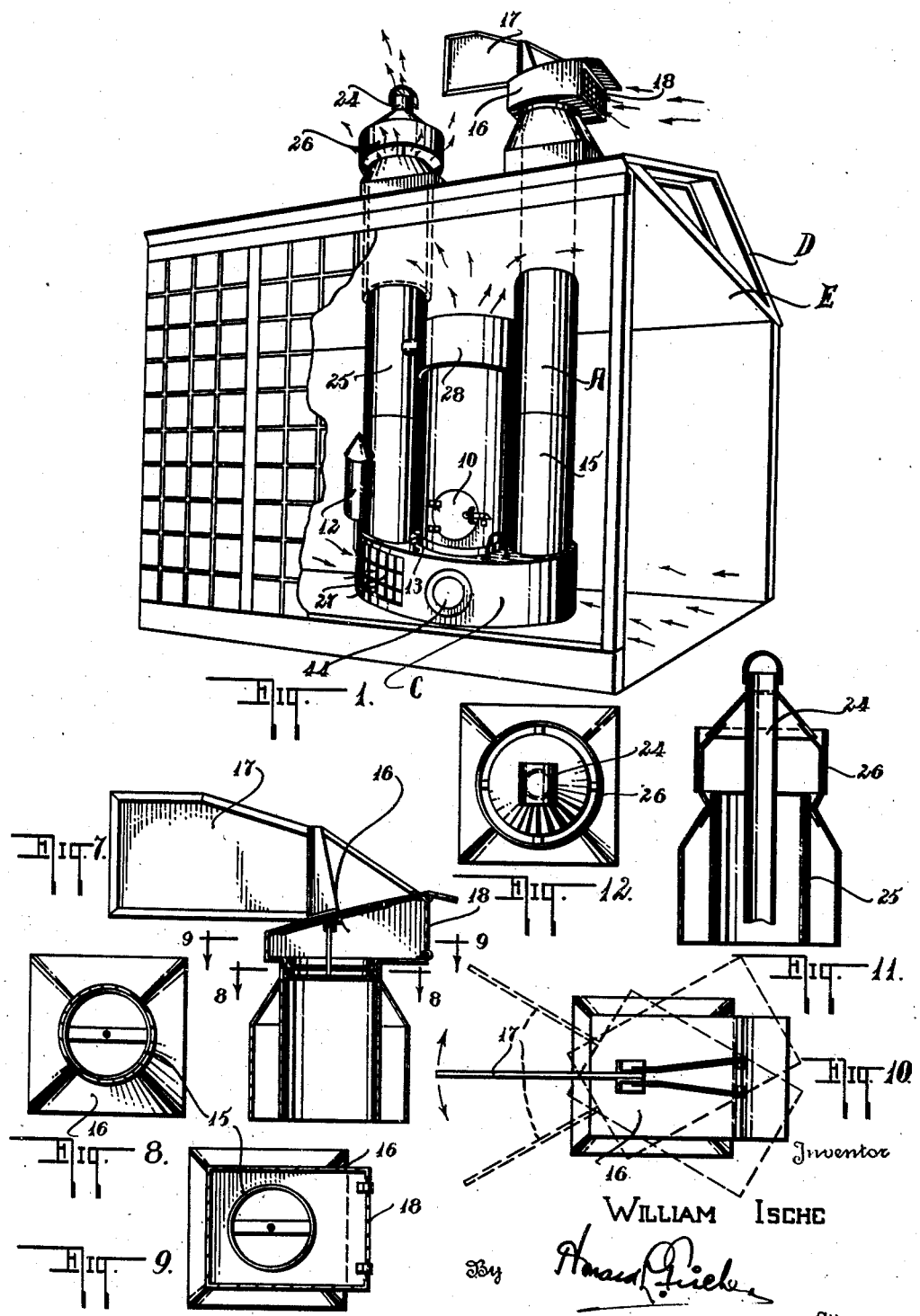

Dec. 21, 1943. W. ISCHE 2,337,105
AIR CONDITIONER AND HEATER FOR BUILDINGS
Filed April 9, 1941 2 Sheets-Sheet 2
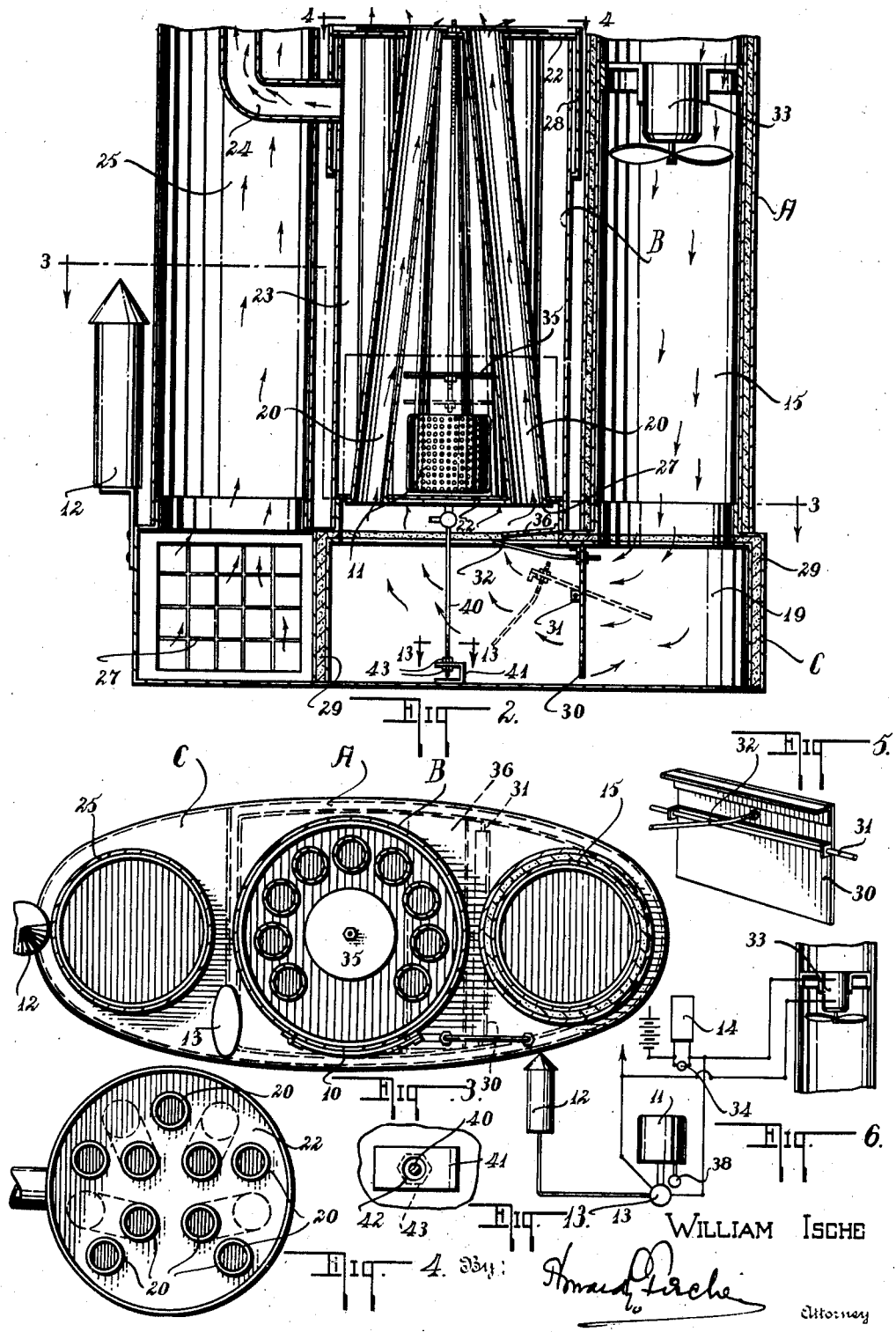
WILLIAM ISCHE Patented Dec. 21, 1943

2,337,105

UNITED STATES PATENT OFFICE 2,337,105

AIR CONDITIONER AND HEATER FOR BUILDINGS

William Ische, Norwood, Minn.

Application April 9, 1941, Serial No. 387,696

2 Claims. (Cl. 237—47)

My invention relates to an air conditioner and heater for poultry houses, where it is desired to air condition and regulate the temperature within the building and without drafts.

A feature of primary importance of my air conditioner resides in a means of regulating the air within a poultry house to keep it fresh, dry, and with a circulation of fresh air without draft which is always undesirable in air conditioning of poultry houses.

My air conditioning and heating system is very desirable for buildings where fowls such as chickens or turkeys or other fowl are desired to be kept in various climates where certain seasons of the year are cold and damp. The operation of my air conditioner is automatic and I am able to provide fresh air to the building where it is installed so that where the same is used in chicken houses and other buildings, even those used for live stock, the air in the building is conditioned with a favorable spring-like temperature.

Hens breathe much faster than human beings. Therefore they use more air. They do not perspire, neither do they have kidney action. Consequently, nearly all of the impurities in a chicken's body are passed off in the breath. They also discharge in the breath an almost unbelievable quantity of moisture. This being the case, it will readily be seen how damp and how disastrously contaminated the air in a poultry house will become unless there is some proviison for drawing off the foul air and changing the air comparatively rapidly within the poultry building. My air conditioner and heater is designed to accomplish these results without undesirable drafts.

A further feature of my air conditioner for buildings resides in means for warming the cold air as it comes in from the outside so that the air is changed, and the ventilation is taken care of in an even manner so that it is not too cold or filled with an excessive amount of moisture.

A feature resides in providing a unitary boiler-like air regulator and heater, wherein I provide a heating unit which is automatically and thermostatically controlled. The unit includes an air intake which is provided with a vaned air receiving hood positioned on the outside of the building where my unit is used which is adjusted by the wind into proper position so as to permit air to flow into the intake passageway and through the heating boiler of the unit. A foul air passageway is also connected to the unit in such a manner so as to draw the impure air from and near the floor of the building and to pass the same out of a hooded ventilator positioned outside of the building.

A further feature resides in providing means for providing a forced draft in the intake passageway. This is accomplished by placing an electrically operated fan in the intake passageway which will cause air to be drawn in through the adjustable hooded ventilator and forced into the air conditioning boiler or system. The circulating fan is operated automatically and may be thermostatically controlled or may be controlled manually by a suitable switch. When it is desired to cool the building or air condition it with fresh air from the outside and there is insufficient draft coming in through the intake ventilator, the electrically operated fan will supply the necessary air into the intake passageway and into the building, thereby providing a circulation of the air which will act as an air conditioning means within the building where my device is located.

These features together with other details and objects will be more fully hereinafter set forth.

In the drawings forming a part of this specification:

Figure 1 is a perspective diagrammatic view of a building showing my air conditioner and heating device in operative position.

Figure 2 is a vertical cross-section through my air conditioner and heater, a portion of which is broken away at the top.

Figure 3 is a section on the line 3—3 of Figure 2.

Figure 4 is a section on the line 4—4 of Figure 2.

Figure 5 is a perspective view of the air damper removed from the air conditioner.

Figure 6 is a diagrammatic wiring diagram illustrating the thermostatic control for the burner and the air circulating fan.

Figure 7 is a sectional side elevation of the vaned air receiving hood.

Figure 8 is a section on the line 8—8 of Figure 7.

Figure 9 is a section on the line 9—9 of Figure 7.

Figure 10 is a plan view of the vaned air receiving hood.

Figure 11 is a vertical section through the air exhaust hood.

Figure 12 is a plan view of Figure 11.

Figure 13 is an enlarged section on the line 13—13 of Figure 2.

My air conditioner and heater A for buildings includes a heating drum or furnace B centrally supported on the elliptical base C and adapted to project upwardly from the same. The heating drum B is of cylindrical formation, having an inspection door 10 on the front of the same and being provided with an oil heater or burner 11 which is supplied with fuel from the tank 12. The fuel from the tank 12 is regulated by the feed valve 13 which may be automatically controlled by the thermostat 14, diagrammatically illustrated in Figure 6.

The base C supports the heating drum B above the floor and provides a means for supporting the air intake pipe 15 which extends up through the building D to the roof of the same where a vaned hooded intake ventilator 16 is employed to close the top end of the intake pipe 15.

The air intake ventilator 16 is formed with a weather vane 17 so that the ventilator may be turned by the wind in a direction so that air will be forced in through the screened ventilating opening 18 as illustrated in Figure 1. Ordinarily air is caused to flow by the force of the wind or draft into the opening 18 and down through the intake pipe 15 into the chamber 19 in the base C, as indicated by the arrows in Figure 2.

Figure 10 illustrates in dotted outline some of the positions of the hood 16 as it would be operated in the wind. However, the ventilator 16 is free to turn completely around so that it will be in proper air receiving position at all times to permit air to flow freely into the intake pipe 15.

The heating drum B is formed with a series of flues 20 the lower ends of which are anchored in the transverse plate 21 extending across and closing the lower end of the heating drum B. The positioning of the flues 20 is arranged in a peculiar manner wherein the lower ends of these tubes are positioned or spaced coaxially to the center of the heating drum B as illustrated in Figure 3; whereas the upper ends of the flues 20 are anchored in the transverse plate 22 and are arranged in a manner so that the upper ends of some of the flues 20 are directed toward the axis of the upper end of the drum B. Thus some of the flues 20 are inclined toward the axis at the top and thereby extend in a manner to be positioned so that the heat from the burner 11 will be fully absorbed by the air passing through all of the flues 20. This arrangement of the flues 20, where all the flues are coaxially spaced in the same radius at the bottom while some of the flues at the top are spaced with a smaller radius than the other flues, provides a means of greater efficiency in transferring heat from the burner 11 to any air passing through the flues 20.

The burner 11 is positioned in the chamber 23 in the drum B so that heat from the burner 11 will be directed around the flues 20. Thus heat from the burner 11 will tend to rise to the header plate 22, circulating freely and fully around the flues 20.

Spaced down the side wall of the drum B from the header plate 22, I provide a smoke or gas outlet pipe 24 which extends into the exhaust pipe or flue 25 of my air conditioner. The pipe 24 rises out through the roof and actually through the exhaust ventilator hood 26, as illustrated in Figure 1.

The exhaust pipe 25 is positioned on the other side of the base C opposite the intake pipe 15 and is adapted to carry the foul air through the ventilator openings 27 off the floor of the building D as illustrated in Figure 1. During the winter months when the heater 11 is in operation, the draft of the exhaust gases through the pipe 24 which extends through the exhaust pipe 25 has a tendency to cause the air in the pipe 25 to rise and be exhausted out of the ventilator 26. Furthermore, the natural draft of foul air off the floor of the building D will tend to travel through the intake openings 27 and out of the exhaust pipe 25 and out into the outer atmosphere through the hood 26 at all times. The heating drum B is provided with an insulating jacket 28 around the top of the same so that the upper end thereof may be insulated and cause the heat from the burner 11 to be absorbed by the flues 20. The base portion C may also be insulated at 29 to prevent the cold air entering in from the pipe 15 in the base C from causing moisture to collect on the outside of the base C, such as during the period of the winter months where my heater is used to ventilate buildings in climates which may become quite cold.

Within the base C I provide a hinged ventilator valve 30 pivoted at 31 and provided with a counter-weight 32 which operates to prevent too strong a draft of air through the base C from the intake pipe 15. Thus the valve 30 acts as a damper to prevent air from blowing through the intake pipe 15 into the heater B with too strong a draft when the wind is blowing or when the air circulating fan 33 is in operation. The air circulating fan 33 is located in the intake pipe 15 and is adapted to be operated either through the thermostat control 14 or the manual switch 34 as illustrated in Figure 6.

I provide an adjustable heat baffle disc 35 positioned above the burner 11 which may be adjusted into desired position as illustrated in dotted outline so that the heat from the burner 11 may be spread out in the heating drum B and directed toward the lower portion of the tubes 20.

To prevent the air from the intake pipe 15 from entering directly up through the flues 20 adjacent the intake pipe 15, I provide an air baffle plate 36 which extends across below the tubes 20 on one side of the boiler, furnace, or heating drum B, as illustrated in Figures 2 and 3.

In operation, my air conditioner and heater is adapted to be placed in a building such as D and usually I have found that it is desirable to place the same adjacent one wall of the building. However, this is optional, and it is apparent that the air conditioner and heater may be positioned any place in the building where it is desired. The elliptical lower base portion provides a smooth unobstructed surface adjacent the floor and also a support which takes up a small amount of room in the building and yet which covers a sufficient area to permit the intake pipe 15 and the exhaust pipe 25 to be large enough to give a free air circulation. With the air conditioner and heater A in operating position in the building and the intake hood operating by the wind, air is freely directed into the intake pipe 15. If the weather conditions are such that there is not sufficient air being passed into the building to properly air condition the same according to the thermostatic control 14 or such other automatic regulator device as may be desired not shown in the drawings, then the air circulating fan 33 may be caused to automatically operate to force fresh air from the outside of the building into the heater B and through the flues 20 and into the building. By forcing air into the building D with the air fan 33, a certain air pressure is directed into the building D, thereby causing the foul air to be exhausted through the openings 27 and out through the exhaust pipe 25. Thus it will be apparent that with my air conditioning device A, even through the wind velocity outside is not sufficient to circulate the air into and out of the building D, I am able to set up such a circulation and air condition the building wherein my device is installed so that fresh air is circulated within the building whenever it is desired. By suitable thermostatic control means 14 or such other instruments as may be employed to regulate the air circulating fan 33, the air within the building D may be kept fresh at all times. Furthermore, by using my air conditioner and heater, the air circulation may be regulated in such a manner that no appreciable draft is caused within in the building.

It will also be apparent that by the regulator 14, the temperature of the air can be automatically regulated so that if the fresh air coming in through the intake 15 is too cold for the predetermined temperature for which the regulator 14 is set, then the burner 11 will automatically sired to heat the air within the building D.

When the air is heated by the furnace or drum B, it is exhausted out through the top of the flues 20 directly into the room in the building where my device A is operating, as illustrated in Figure 1. Thus hot air may be exhausted out of the furnace or heater B whenever it is desired to heat the air withinin the building D. A suitable pilot 38 illustrated in Figure 6 for the burner 11 may be operated at all times so that it will keep the burner 11 in readiness to be ignited when the regulating valve 13 operates to feed more fuel to the burner and heat is required from the furnace B.

I have found that my air conditioner and heater is very desirable for poultry houses because it keeps the air so well conditioned that the building is always dry and warm; and even in the most severe weather, the air conditions within the building wherein my air conditioners are used is ideal for poultry and for other animals. In being able to regulate the air within a poultry house, the hens lay more eggs and are kept healthy because of the ideal condition within the building. The same advantages are apparent in other farm buildings, even in cattle barns or hog houses; and in fact, I have found my air conditioner and heating device to be very desirable for any building where it is desirable to have ideal air conditions therein.

The burner 11 is adjustable to levelize the same by means of the rod 40 which is adjustably supported in the channel bracket 41. The bracket 41 has an enlarged hole 42 in the same so that the rod 40 may be shifted in any direction to levelize the burner 11. When the burner is in proper adjustment, it is held by the nuts 43 in locked position.

The fan 33 may be interchangeable so that it can be placed in the flue 25 if desired. The down draft flue 15 admits the fresh air into the heater and into the building. As the fresh air enters the down draft flue 15 coming in through the ventilator 16, it passes into the heater and up through the flues 20. If the burner is operating, the fresh air is heated and then passed out through the top of the heater and into the room E of the building D. The down draft flue 15 is insulated from the ceiling of the room E to the base portion C which is also insulated as hereinbefore set forth. I provide an inspection door 44 in the base C so that that compartment may be inspected, or the damper 39 adjusted when it is desired.

The exhaust flue 25 is insulated from the ceiling of the room E to the exhaust hood 26, as illustrated in Figure 1. The principle of insulating the exhaust hood from the inside of the ceiling to the exhaust hood 26 is to keep the air warm as it is exhausted out of the flue 25, thus aiding in the exhausting of the air through the flue 25 and so as not to make a temperature differential in the flue 25 at any point. The same thing is true of the down draft flue 15 in addition to providing the insulating means in this down draft flue so that it will not sweat as cold air is brought into the warm building, and thus the building may be kept in proper condition.

I claim:

1. An air conditioner for poultry houses, comprising a casing adapted to be positioned within a poultry house room, a vertical duct at each end of said casing normally extending to atmosphere, a heating chamber located between said ducts and having a system of flues extending therethrough, said flues being connected at their bottom with one of said ducts and opening at their tops into the poultry house so as to direct the heated air towards the ceiling of said room, a heater in said heating chamber, a hot gas pipe leading from said heating chamber through the second of said ducts, said second duct being heated at its upper part thereby and having openings at its bottom whereby said heating and introduction of fresh air into the room will cause foul air to be drawn from the bottom of the room to be discharged through said second duct, and means for causing a current of fresh air to pass through the first-named duct and through said system of flues into the room.

2. An air conditioner for poultry houses, comprising a casing adapted to be positioned within a poultry house room, a vertical duct at each end of said casing normally extending to atmosphere, a heating chamber located between said ducts and having a system of flues extending therethrough, a chamber extending below one of said ducts and below the lower ends of said flues and opening into all of them, said flues opening at their tops into the poultry house room so as to direct the heated air towards the ceiling of said room, a heater in said heated chamber, a hot gas pipe leading from said heating chamber through the second of said ducts, said second duct being heated at its upper part thereby and having openings at its bottom whereby said heating and introduction of fresh air into the room will cause air to be drawn from the bottom of the room to be discharged through said second duct, and a blower in said first named duct for causing a current of fresh air to pass through the first named duct and through said chamber and system of flues into the upper part of the room.

WILLIAM ISCHE.